US010906170B2

(12) United States Patent
Zaffaroni (10) Patent No.: US 10,906,170 B2
(45) Date of Patent: Feb. 2, 2021

(54) GRIPPING TOOL AND IMPROVED SORTING SYSTEM MAKING USE OF SAID TOOL

(71) Applicant: ASTES4 SA, Balerna (CH)

(72) Inventor: Roberto Zaffaroni, Balerna (CH)

(73) Assignee: ASTES4 SA, Balerna (CH)

( * ) Notice: Subject to any disclaimer, the term of this patent is extended or adjusted under 35 U.S.C. 154(b) by 0 days.

(21) Appl. No.: 16/655,535

(22) Filed: Oct. 17, 2019

(65) Prior Publication Data

US 2020/0122317 A1  Apr. 23, 2020

(30) Foreign Application Priority Data

Oct. 17, 2018 (IT) .................. 102018000009542

(51) Int. Cl.
| | | |
|---|---|---|
| *B25J 9/00* | (2006.01) | |
| *B25J 15/00* | (2006.01) | |
| *B25J 15/06* | (2006.01) | |
| *F16B 5/06* | (2006.01) | |
| *B25J 17/02* | (2006.01) | |

(52) U.S. Cl.
CPC ......... *B25J 9/0096* (2013.01); *B25J 15/0061* (2013.01); *B25J 15/0625* (2013.01); *B25J 17/0241* (2013.01); *F16B 5/0621* (2013.01)

(58) Field of Classification Search
CPC .. B25J 9/0096; B25J 15/0061; B25J 15/0625; F16B 5/0621
USPC .................................................. 294/183, 65
See application file for complete search history.

(56) References Cited

U.S. PATENT DOCUMENTS

| | | | | | |
|---|---|---|---|---|---|
| 2,903,290 | A | * | 9/1959 | Morris | .................. A01K 43/00 294/65 |
| 3,062,578 | A | * | 11/1962 | Bushong | ................ B65B 23/08 294/65 |
| 3,934,916 | A | * | 1/1976 | Baker | ..................... A21B 3/18 294/189 |

(Continued)

FOREIGN PATENT DOCUMENTS

| | | |
|---|---|---|
| DE | 10 2008 057246 | 5/2010 |
| EP | 0 919 515 | 6/1999 |

(Continued)

OTHER PUBLICATIONS

Italian Search Report, IT2018000009542, dated Jul. 11, 2019.

*Primary Examiner* — Paul T Chin
(74) *Attorney, Agent, or Firm* — Nixon & Vanderhye (57) ABSTRACT

A sorting system and a gripping tool thereof to be mounted on a handling device for handling pieces cut out from planar sheets are disclosed. The gripping tool includes: an engaging head interchangeably paired with an operating end of a displaceable handling device: an actuator mounted on the engaging head, including at least a first actuator unit; and attaching and coupling units having attaching and coupling devices, mounted on the engaging head. The attaching and coupling units are mounted on a frame including at least four rods articulated together through respective hinges arranged on a lying plane. The attaching and coupling devices are arranged on a plane parallel to the lying plane. The articulated frame being supported on the engaging head. The first actuator unit drives at least one of the rods of the articulated frame by rotation around at least one of the hinges on the lying plane.

20 Claims, 7 Drawing Sheets

(56) References Cited

U.S. PATENT DOCUMENTS

| | | | | |
|---|---|---|---|---|
| 4,411,574 A | * | 10/1983 | Riley | B65B 21/20 |
| | | | | 198/432 |
| 5,094,311 A | * | 3/1992 | Akeel | B62D 57/032 |
| | | | | 180/119 |
| 5,988,718 A | * | 11/1999 | Sugimoto | B65G 47/918 |
| | | | | 294/65 |
| 8,832,918 B2 | * | 9/2014 | Ali | B23P 19/10 |
| | | | | 29/423 |
| 8,876,182 B2 | * | 11/2014 | Eidelberg | B66C 1/00 |
| | | | | 198/468.3 |
| 2012/0119528 A1 | * | 5/2012 | Herfert | B65G 47/91 |
| | | | | 294/65 |
| 2018/0036892 A1 | * | 2/2018 | Berns | B25J 15/0061 |
| 2018/0250833 A1 | * | 9/2018 | Boria | B25J 15/0095 |
| 2019/0255713 A1 | * | 8/2019 | Churchill | B25J 15/0425 |

FOREIGN PATENT DOCUMENTS

| | | |
|---|---|---|
| WO | WO 2008/139409 | 11/2008 |
| WO | WO 2018/178348 | 10/2018 |

\* cited by examiner

GRIPPING TOOL AND IMPROVED SORTING SYSTEM MAKING USE OF SAID TOOL

FIELD OF THE INVENTION

The present invention relates to the field of planar sheet handling in cutting centres, in particular it relates to a tool and system for a handling device for picking-up and sorting sheet pieces and the related swarf.

STATE OF THE PRIOR ART

As known, in planar sheet cutting centres—wherein, from a sheet of metal, single shaped pieces are obtained through various cutting devices (laser beam, oxygen lance, water jet, plasma cutting and so on)—there is the need to pick-up the various cut-out pieces (or the resulting swarf) and orderly place them on workstations or storage arrangements.

The pieces to be handled consist of planar sheets of small thickness (e.g. from 0.5 to 25 mm) which, however, have very different shapes, either in terms of extension on the individual dimension, or in terms of surface area, or in terms of geometric complexity.

In the known art there are already several handling machines, specifically intended for managing these pieces, with identification, gripping, movement and ordering operations of the pieces which are generally referred to as 'sorting'. WO2008/139409 describes a particularly effective one of these machines.

In view of the significant variability in shape of the cut-out pieces, it is normal practice to provide, next to the handling machine, for a warehouse of different tools: the handling devices on board of the machine are programmed for tool changeover when necessary, i.e. they are brought closer to the warehouse, they change the tool used and perform the expected 'sorting' cycle. In this way, the same handling devices are provided with different terminal tools according to the needs of the pieces to be withdrawn.

However, as can be understood, the tool changeover step constitutes a dead time during the operation of the machine. Ideally, therefore, the smaller the number of tools needed to manage the pieces, the greater the efficiency of use of the machine. To this end, it is desired to have flexible tools, i.e. tools suitable for picking-up as many different pieces as possible, compatibly with their actual withdrawing and movement effectiveness.

In this context, it is not easy to provide tools that can be adapted to pick up pieces very different from each other, either because they must have a solid structure—having to withdraw even metal pieces that can weigh several kilos—and because the distances travelled by the handling devices are wide (even of several meters), and, finally, because the energy on board of the handling devices is typically pneumatic (used by suction cups for picking-up the flat pieces) rather than electric.

In other fields, tools for handling devices provided with suction cups which are movable in position are already known. This technology finds application for example either in pick&place machines for the movement of a plurality of small objects that should be withdrawn in a certain spatial arrangement and placed with a different arrangement, or for handling small objects whose size varies in the work sequence. For this purpose, according to the prior art, suction cups with the respective valves are movably mounted on linear guides, arranged in a single direction or along converging directions (e.g. radial), so as to adapt the size or pace of the individual gripping positions of the suction cups.

However, the linear movement of the gripping positions can cope with variations in size, but not with significant variations in shape and dimensional ratios of the objects to be handled. Furthermore, when fairly large and heavy pieces must be lifted, the linear guide mode of the individual gripping positions is not appropriate, since it would ultimately produce high frictions and wear incompatible with the lifespan of the system.

Other examples of adaptable tools for handling devices are known in the art. For example, DE102008057246 relates to a gripping tool provided with a plurality of suction cups mounted on an articulated frame. The articulated frame could be extended or folded, modifying the relative position of the suction cups. However, the control requires the use of two electric motors, mounted on moving parts and therefore requiring the passage of electrical cables on modifiable paths. Furthermore, the frame provides for an alternate linear motion of a guide slot, which presents maintenance problems. Finally, the suction cups can be moved away from and closer to a fixed central portion of the frame and thus there are restrictions on the positions they may assume with respect to the CG of the frame.

Another example is constituted by EP919515, which relates to another variable geometry gripping tool. In this case, suction cups are provided mounted at the end of pairs of arms articulated to a central base wherein a drive gear is provided. The structure is very complex and heavy and has considerable geometry restrictions, since the four suction cups can radially move closer to and away from the central base, thus they are capable of adapting to the dimensions of pieces with different radial extension, yet they are not capable of adapting to the geometries of pieces with different aspect ratios.

Therefore, in the field of sorting sheet pieces a solution suitable for obtaining a satisfactory adaptability of the piece handling tool is yet to be found.

SUMMARY

The problem underlying the invention is therefore to propose a handling device tool adaptable to the different shapes of pieces managed by a planar sheet cutting centre, so as to reduce the number of tool changeovers and therefore increase the productivity of the sorting system.

In addition, it is desired to provide a tool which is also sufficiently flexible in use, in order to be able to offer a wide range of different modes to pick-up and release workpieces.

These objects are achieved by a tool having the essential features mentioned in the main appended claims. The dependent claims describe preferred features of the invention.

In particular, according to a preferred aspect of the invention, it is provided a gripping tool to be mounted on a handling device for handling pieces cut out from planar sheets, comprising an engaging head being interchangeably paired with an operating end of a displaceable handling device, actuation means mounted on said engaging head, comprising at least a first actuator unit, and a plurality of attaching and coupling units provided with attaching and coupling devices, mounted on said engaging head, wherein said attaching and coupling units are mounted on a frame comprising at least four rods articulated together through respective hinging means arranged on a lying plane, said attaching and coupling devices being arranged on a plane parallel to said lying plane, said articulated frame being supported on said engaging head, and said first actuator unit drives at least one of said rods of said articulated frame by rotation around at least one of said hinging means on said lying plane.

According to a preferred aspect, said first actuator unit drives said one of said rods such that the articulated frame takes two end-of-travel configurations, a folded one, wherein said attaching and coupling units are close to each other and aligned, and a deployed one, wherein said attaching and coupling units are spaced apart along two different Cartesian axes.

Preferably, said attaching and coupling units are arranged at the hinging means.

According to another aspect, said articulated frame is supported on said engaging head through two parallel rotation pins perpendicular to said lying plane.

According to a preferred aspect, the articulated frame has four articulated movable rods, two of which being connected integral in rotation with said parallel rotation pins.

According to an aspect, said attaching and coupling devices are in the form of suction cups supported on respective valve bodies.

Another aspect of the invention, provides that an articulated extension unit is placed between said engaging head and said articulated frame, configured so that said lying plane may be rotated from a horizontal attitude to a vertical attitude. Preferable, the articulated extension unit has a swinging arm rotatably mounted on a pneumatic cylinder integral with said engaging head, the rotation axis of said pneumatic cylinder being arranged horizontally. Moreover, the articulated frame is supported on said engaging head through a dismountable intermediate head composed of two paired plates.

According to another aspect of the invention, it is provided a sorting system for cut-out metal sheet pieces which comprises a tool as described above as well as a deposition rack equipped with parallel bearing rods and with a corresponding up-right support for supporting a plurality of up-right pieces placed alongside to each other.

BRIEF DESCRIPTION OF THE DRAWINGS

Further features and advantages of the invention will however be more evident from the following detailed description of a preferred embodiment, given by mere way of non-limiting example and illustrated in the accompanying drawings, wherein.

DETAILED DESCRIPTION OF THE PREFERRED EMBODIMENT

A machine for managing pieces cut out from metal sheets, also called sorting apparatus, has one or a plurality of mobile handling devices (not shown)—for example four handling devices as described in WO2008/139409—equipped with a terminal head T1, to which a series of different removable tools can be suitably engaged.

A tool for the movement of cut-out pieces has in turn an engaging head T2, intended to firmly pair, through short rotation or reciprocal engagement motions, with the terminal head T1 of the handling device. The engaging head T2 of the various tools has the same configuration, so as to ensure the interchangeability of the tools on the terminal heads T1 of the handling devices.

On the tool engaging head T2 are mounted the tool operating components. Through the engaging head T2 are also passing energy transfer lines, which come from the end of the handling device and are intended for the operating components: typically, the energy transfer lines are pneumatic pipes (of the vacuum or compressed air type), but could be also electric cables.

Figure 1:
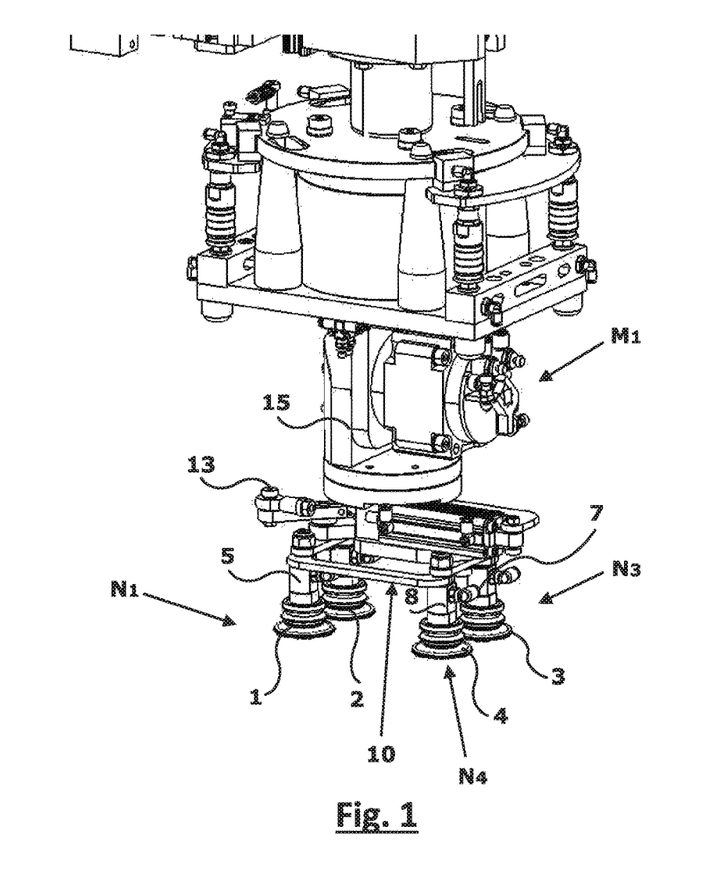
FIG. 1 is a perspective view of a tool according to the invention in an extended condition.

Referring to FIG. 1, the operating components, in the specific application of lifting metal sheet pieces, comprise a gripping assembly formed by one or more attaching and coupling units $N_1$-$N_4$. The latter are, for example, in the form of suction cups 1-4 mounted at the end of a suitable valve body 5-8 on which the end of a pneumatic pipe (not shown) of the aforementioned energy transfer lines is engaged. The pneumatic pipe is connected to a vacuum pump suitable for creating a negative pressure at the open end of the suction cups 1-4, which are thereby suitable for holding a metal sheet or a flat piece.

The attaching and coupling units $N_1$-$N_4$ are arranged so that their parts intended to be attached to the piece to be picked-up, i.e. the contact part of the suction cups 1-4, lie in a same coupling plane. Therefore, the attaching and coupling units $N_1$-$N_4$ are arranged with the respective axes of symmetry parallel to each other.

According to the invention, the individual attaching and coupling units $N_1$-$N_4$ are mounted cantilevered and projecting from an articulated frame 10, composed of at least four rods/links articulated together through at least four hinging elements $C_1$-$C_4$, thereby forming an articulated quadrilateral link.

The at least four hinging elements $C_1$-$C_4$ are arranged in a lying plane which is parallel to the coupling plane of the suction cups 1-4.

Depending on how the articulated frame 10 is constrained to a support thereof, for example to an intermediate head $T_3$, its articulated arms follow a typical kinematic mechanism of articulated parallelogram or pantograph or hybrid conditions.

In the embodiment shown in the figures (see in particular FIGS. 3A and 3B), the frame 10 is composed of four rods/links $10^i$, $10^{ii}$, $10^{iii}$, $10^{iv}$, with opposite pairs of equal length, articulated together through the four hinging elements $C_1$-$C_4$.

Figures 3A, 3B:
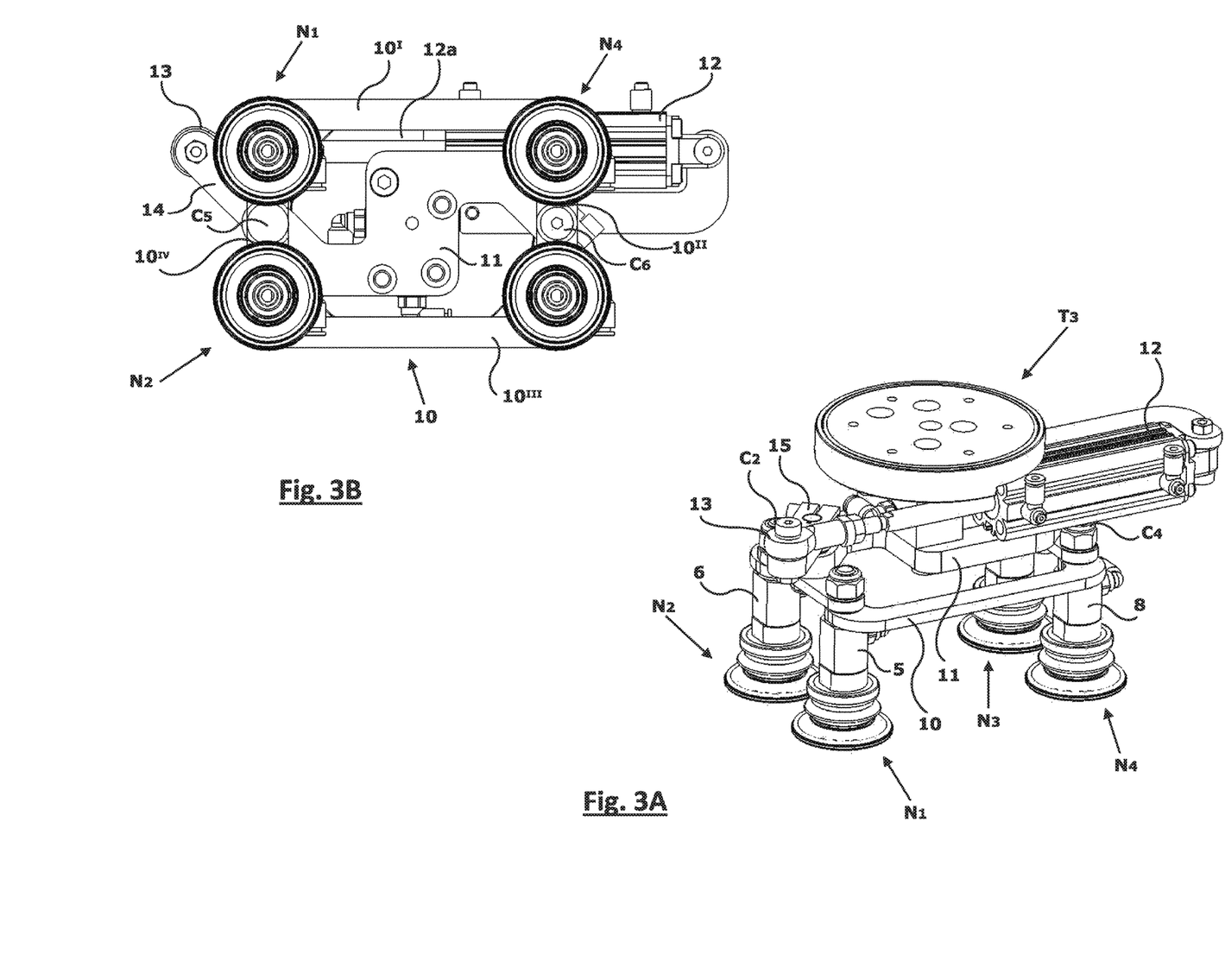
FIG. 3A is a perspective view of the coupling unit assembly of the tool in extended condition
FIG. 3B is a plan view from below of the assembly of FIG. 3A.

On a support bracket 11, integral with the intermediate head $T_3$, are also provided two rotation pins $C_5$ and $C_6$ on which two opposite rods $10^{ii}$, $10^{iv}$ of the articulated frame 10 are integrally mounted in rotation. The articulated frame 10 can therefore assume different attitudes, remaining on its plane, through simple rotations around the rotation axes of the two pins $C_5$ and $C_6$ perpendicular to the lying plane.

The hinging elements $C_1$-$C_4$ are preferably spindles integral with the valve bodies 5-8, provided with a threaded end on which an attaching nut is engaged.

Preferably, both the rotation pins $C_5$ and $C_6$, and the hinging elements $C_1$-$C_4$ are equipped with rolling or sliding bearings, to reduce friction even in the presence of significant weights burdening the tool.

On the support bracket 11 an actuator 12 is further mounted, equipped with an actuating stem 12a constrained with a hinge 13 to a small arm 14 integral in rotation with one of the rotation pins $C_5$. Alternatively, the actuating stem 12a could be constrained to other parts of the articulated frame 10 and has however the function of transferring the control from the actuator 12 to the frame 10, so as to change its configuration as necessary.

The actuator 12 is preferably a single-stroke pneumatic actuator (i.e. not partializable), suitable for controlling the frame 10 into two opposite end-of-travel attitudes. For simplicity, the actuator 12 is preferably controlled by a single electrovalve (not shown) which introduces or releases air pressure in the double-acting circuit of the actuator: when the electrovalve is de-energized, the articulated frame 10 assumes a first folded position shown in FIGS. 4A and 4B, when, on the contrary, the electrovalve is energized, the frame 10 assumes a second extended position shown in FIGS. 3A and 3B.

The two positions can be achieved through a double-acting actuator or with a single-acting actuator which cooperates with return elastic means.

In particular, as can be seen in the figures, the frame 10 toggles from a first folded configuration, wherein the attaching and coupling units $N_1$-$N_4$ are aligned with and in a close position to each other, to a second deployed configuration, wherein the attaching and coupling units $N_1$-$N_4$ are arranged at the vertices of a rectangle whose sides are the four rods $10^i$, $10^{ii}$, $10^{iii}$, $10^{iv}$.

Figure 2:
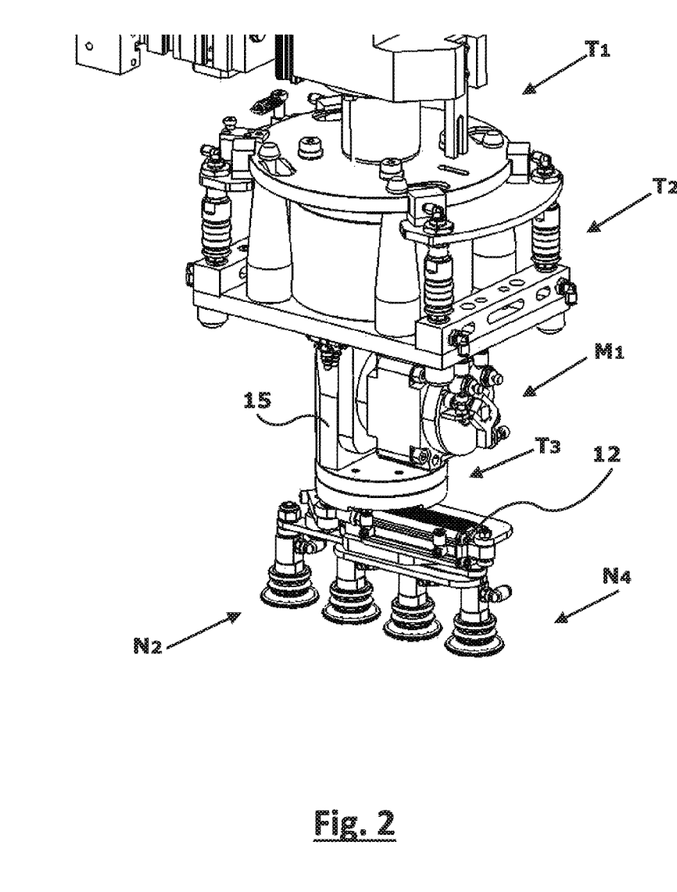
FIG. 2 is a view similar to that of FIG. 1 with the tool in a folded condition.
Figures 4A, 4B:
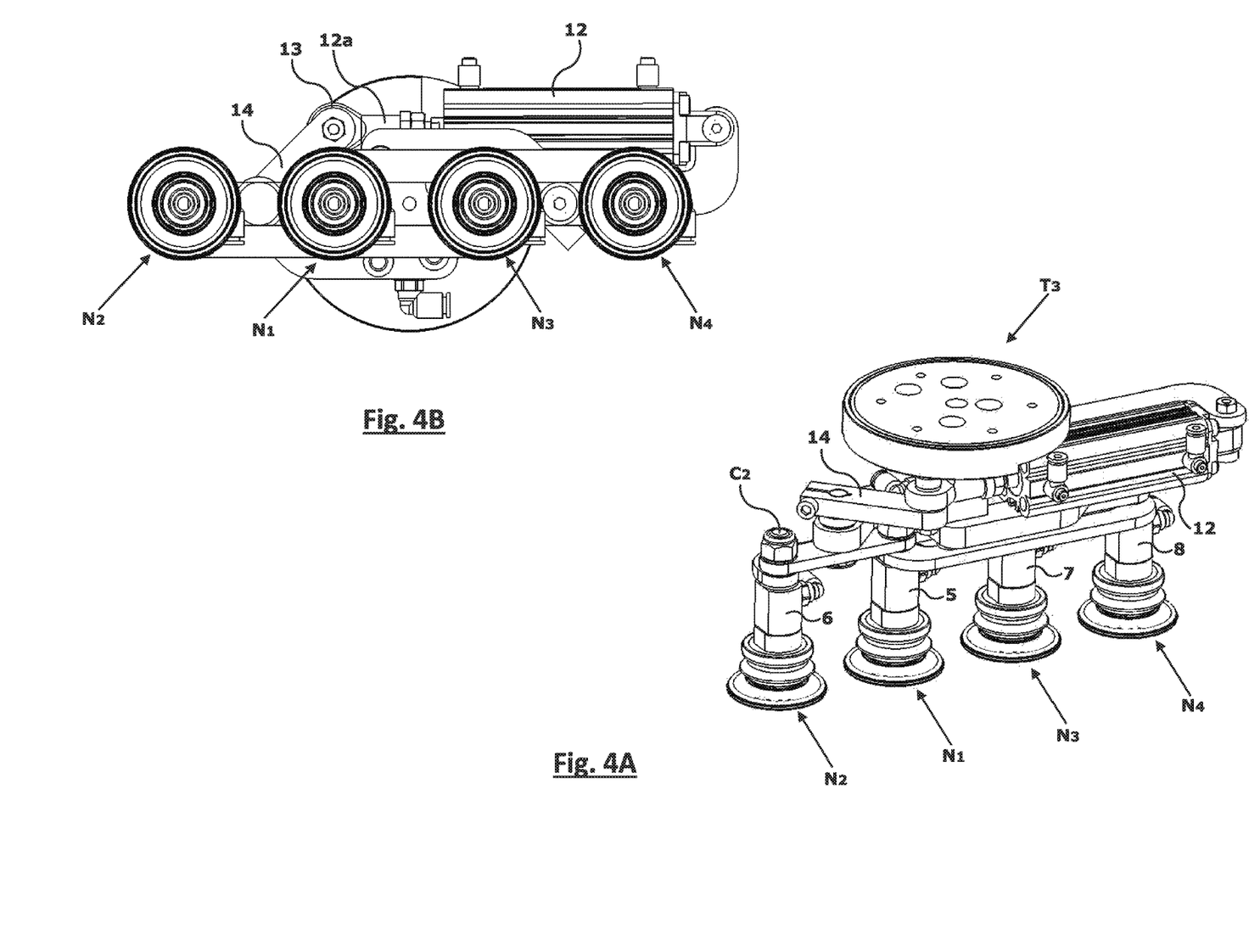
FIG. 4A is a perspective view of the assembly of FIG. 3A in a folded condition.
FIG. 4B is a plan view from below of the assembly of FIG. 4A.
Figure 5A:
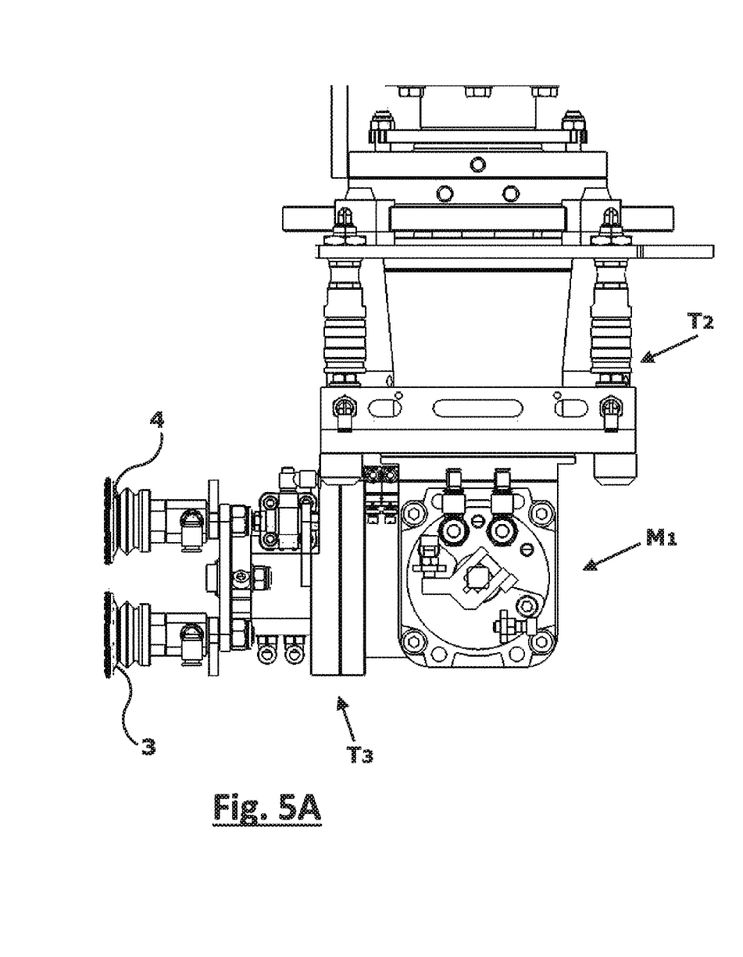
FIG. 5A is an elevational side view of the tool according to the invention, with the coupling unit assembly in an extended condition and rotated by 90°.
Figure 5B:
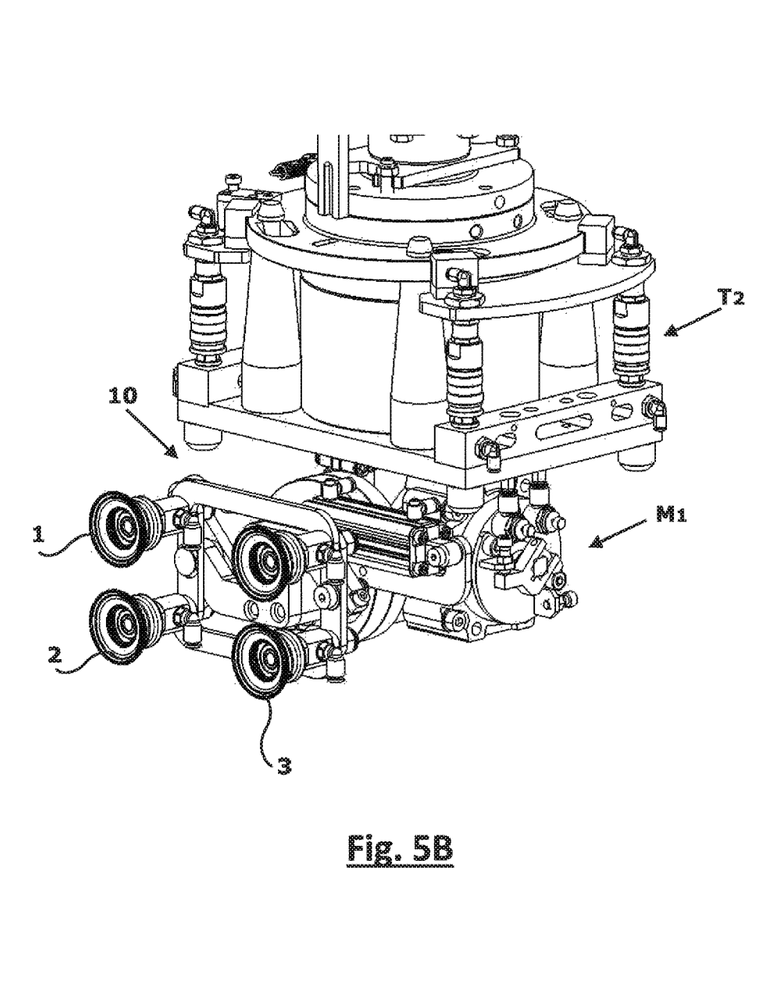
FIG. 5B is a perspective view of the tool of FIG. 5A.
Figure 6A:
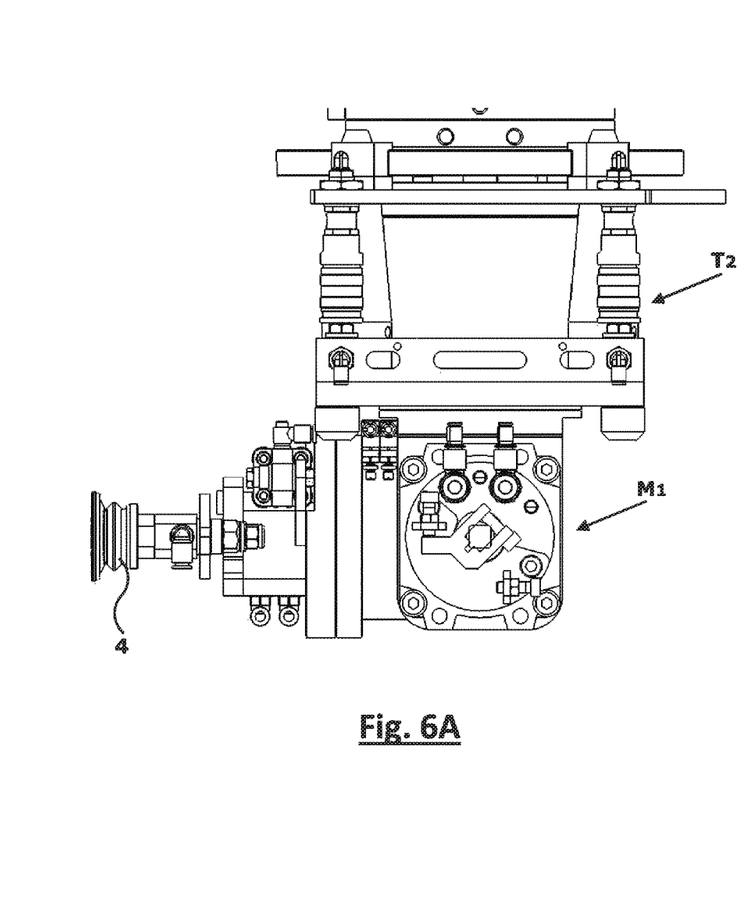
FIG. 6A is a view similar to that of FIG. 5A, with the coupling unit assembly in a folded condition.
Figure 6B:
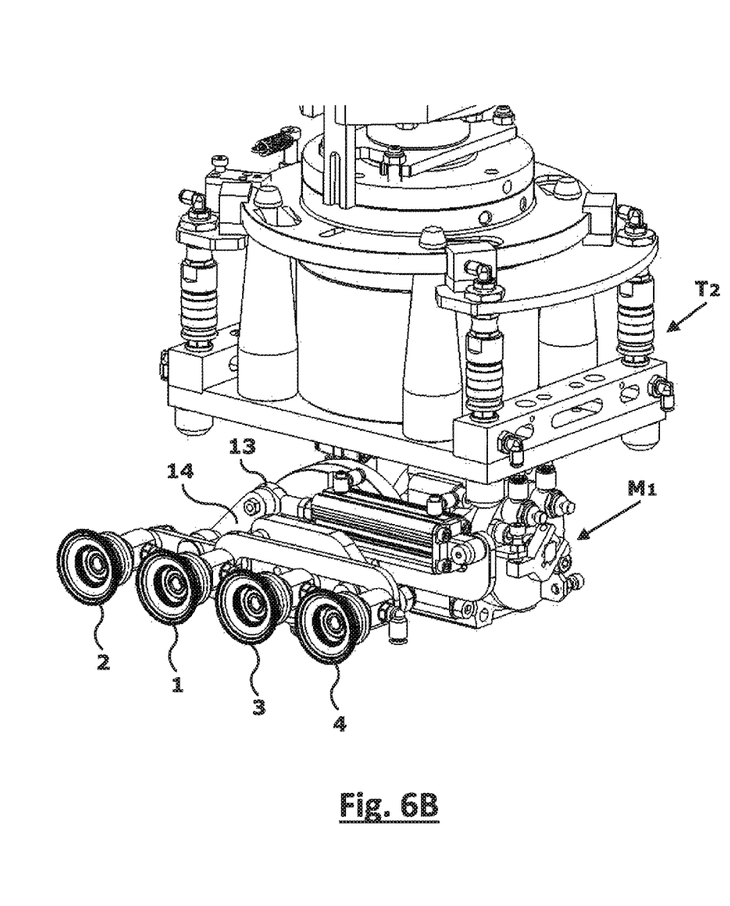
FIG. 6B is a view similar to that of FIG. 5B with the coupling unit assembly in the conditions of FIG. 6A.

To obtain an advantageous alignment of the attaching and coupling units $N_1$-$N_4$, as can be seen for example in FIGS. 2 and 6B, preferably two opposite rods $10^i$ and $10^{iii}$ are generally C-shaped, with the hinging elements $C_1$-$C_4$ arranged at the curved ends of the C-shape. In this way, the main portion of the rods $10^i$ and $10^{iii}$ does not interfere with the units $N_1$ and $N_3$ that are in an intermediate position in the folded configuration (FIG. 4B).

The geometric variation that may be achieved makes the use of the gripping arrangement effective both for long and narrow pieces (in the deployed configuration), and for pieces with a more squared dimensional ratio (in the unfolded configuration).

This geometric variation capability allows to combine in a single tool multiple different configuration, representing as many as four different tools of the prior art. The need for tool changeover in multiple conditions is therefore eliminated, reducing cycle times, and the space occupied in the tool warehouse is reduced (and thus the relative encumbrance on the ground near the machine).

The intermediate head $T_3$ preferably has two homologous plates, one integral with the bracket 11 of the articulated frame 10 and one integral, directly or indirectly, with the engaging head $T_1$. The subdivision into two plates stabilizes the connection (two flanges suitable for being paired with screws, for example), simplifies the assembly/disassembly operations and allows to have connections in register for the energy transmission lines.

According to a preferred embodiment of the invention, furthermore, one side of the intermediate head $T_3$ is integral with an articulated extension unit, suitable for rotating the same intermediate head around a horizontal axis. In particular, the illustrated exemplary extension unit provides for a swinging arm 15 component rotatably mounted on a pneumatic motor or cylinder $M_1$ integral, in turn, with the engaging head $T_2$. The rotation axis of the pneumatic cylinder $M_1$ is arranged horizontally. The rotating pneumatic cylinder $M_1$ can assume two end-of-travel positions, causing the swinging arm 15 to rotate correspondingly, for example by 90°. The angle of rotation of the swinging arm 15, for example by 90° or by another predefined angle (between 0 and 90°), is preferably defined through mechanical register means, by which the position of two end-of-travel abutments of the extension unit is adjusted.

Providing for this articulated extension unit advantageously allows to move the lying plane of the attaching and coupling units $N_1$-$N_4$ from a horizontal attitude (FIGS. 1-2) to an almost vertical attitude (FIGS. 5A-6B), with the gripping unit assembly both in folded condition and in deployed condition.

Due to this adaptability feature of the units $N_1$-$N_4$, both in the lying plane and in the spatial orientation, it is also possible to carry out innovative sorting operations in this field.

In particular, as an accessory of the tool according to the invention, a rack R is provided (FIGS. 7 and 8), formed by a support frame 20 on which pairs of parallel bearing rods 21a and 21b are attached, between which an up-right support 22 is also provided.

Figure 7:
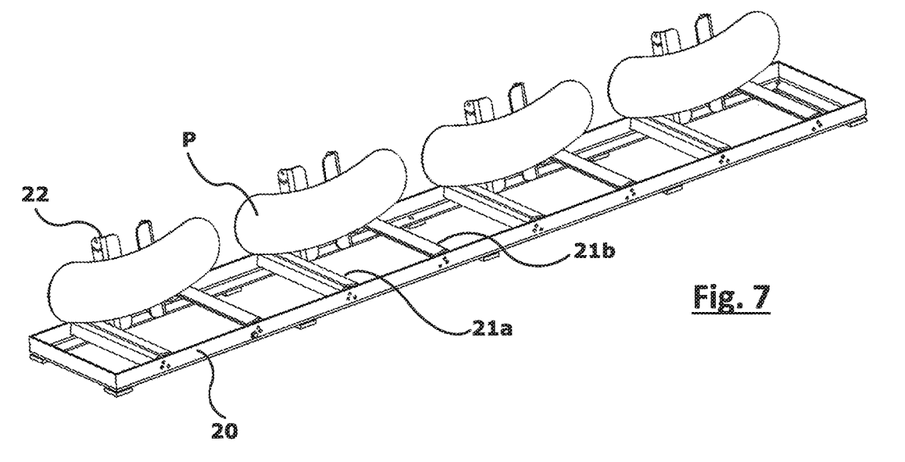
FIG. 7 is a perspective schematic view of an exemplary deposition rack.
Figure 8:
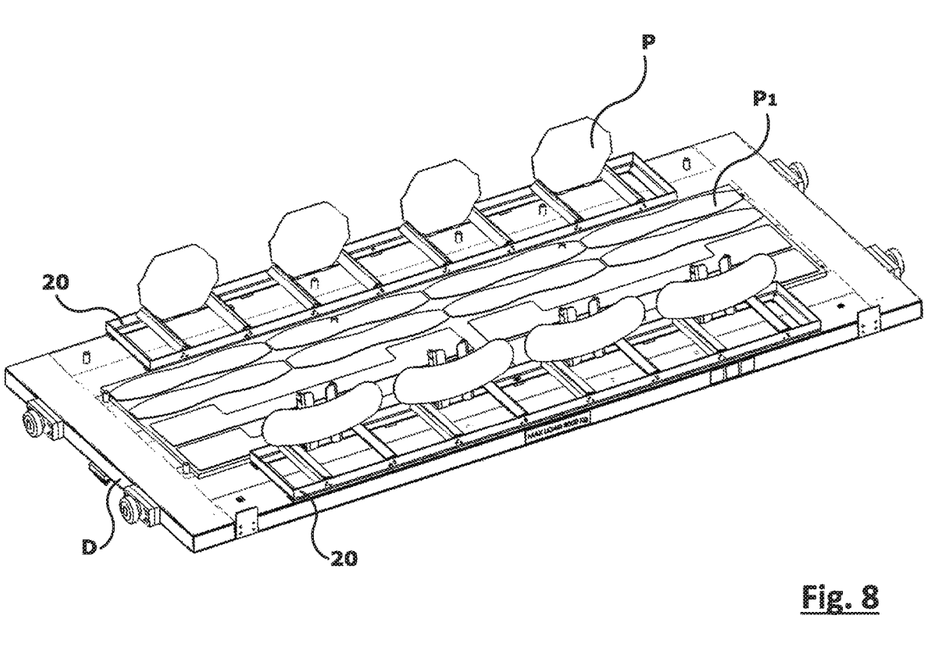
FIG. 8 is a perspective view of a deposition table with a pair of exemplary deposition racks.

The bearing rods 21a and 21b have at least one portion of surface appropriately treated—for example coated with soft material—to serve as a bearing for the cut-out metal sheet pieces P, with the purpose of not creating abrasions and holding them in position. Preferably the rods 21a and 21b are swingingly mounted on the frame 20, i.e. rotatable on their longitudinal axis, being thereby arranged so as to face the portion of treated surface in the best way to accommodate the specific shape of the cut-out pieces P.

The rack R is provided for arranging the cut-out sheet pieces P next to each other in an almost up-right position (as shown in the figures). To this end, at the end of the bearing rods 21a and 21b, on one side of the rack, the up-right supports 22 are provided.

The cut-out pieces P therefore abut, by their lower edge on the rods 21a and 21b, while by their back side to the supports 22, thereby maintaining a substantially up-right position.

As depicted in FIG. 8, the deposition warehouse of the pieces P may be thereby configured as a drawer D on which some pieces $P_1$ are traditionally laid flat, other pieces P are placed up-right next to each other on one or more racks.

Figure 9A:
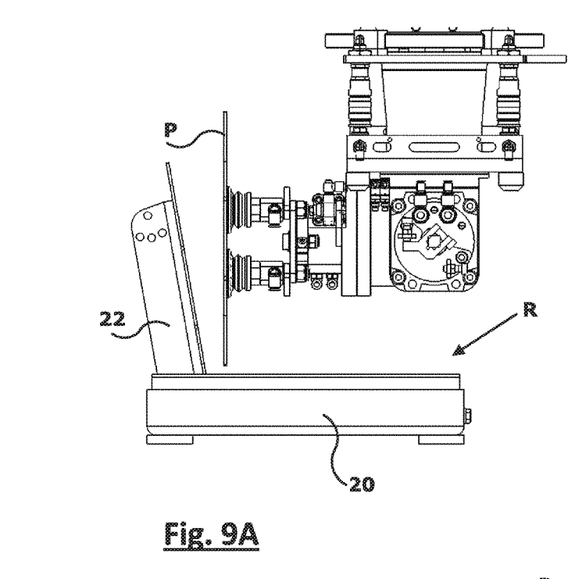
FIGS. 9A-9C are elevational side views showing a deposition sequence of the tool of the invention using a rack as in FIG. 7.
Figure 9B:
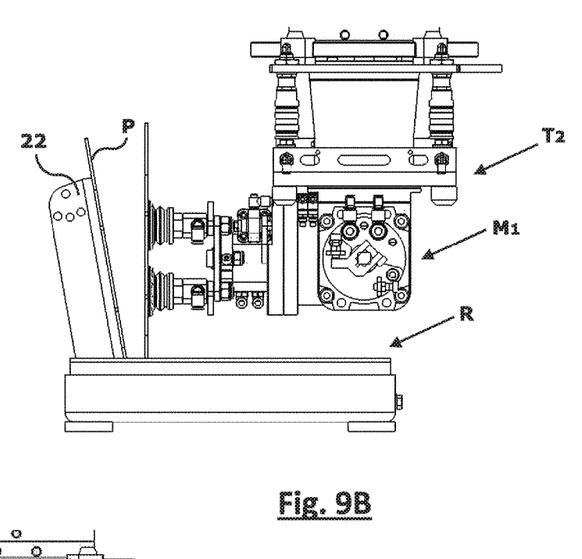
Figure 9C:
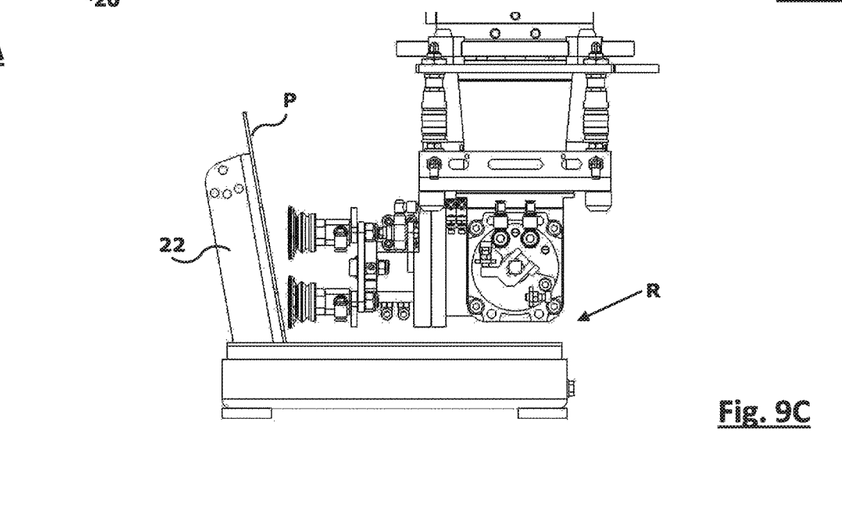

In FIGS. 9A-9C a deposition sequence of a piece P on the rack 20 through the tool according to the invention is shown.

In FIG. 9A, the piece P is on board of the tool, which has already been rotated by 90° after having picked up the piece P in the horizontal attitude. The handling device brings the tool closer to the rack 20, then a vertical translation is carried out until the lower edge of the piece P is laid on the bearing rods 21a and 21b. The vacuum pump, which keeps the suction cups 1-4 suctioning and therefore attached to the metal sheet piece P, is turned off (FIG. 9B). The pneumatic circuit is possibly inverted, producing a blast of compressed air out of the suction cups 1-4, so as to push the piece P to abut against the up-right support 22 (FIG. 9C). This same sequence is also repeated with the subsequent pieces, which are progressively placed next to the previous ones, providing to displace the lowering position of the tool in each cycle, so as to place the individual pieces already in their correct position on the rack.

As can be seen from the above description, the tool according to the invention perfectly solves the objects set forth in the introduction.

The attaching and coupling unit assembly has a variable geometry suitable for picking up metal sheet pieces of different linear extension but also of variable shape and dimensional ratios. The structure of this assembly, provided with only hinges and a single actuator, is defined in a simple, economical and suitable way to also support significant weights, not relying on linear guides.

The tool provides for drivers that may be controlled by an energy line even only of the pneumatic type, for the benefit of its application to multiple existing handling devices.

It is understood, however, that the invention is not to be considered as limited to the particular arrangement illustrated above, which represents only an exemplary embodiment thereof, but different variants are possible, all within the reach of a person skilled in the art, without departing from the scope of the invention itself, as defined by the following claims.

For example, next to or in place of the pneumatic actuators it is possible to provide, if preferred, for electric actuators, possibly having continuous control over a predefined stroke. Actuators can have a driving element providing either a linear movement (for example transferred to a lever) or a rotation movement (for example transferred to one of said rotation pins).

Moreover, although only four attaching and coupling units have been illustrated, a greater number thereof could also be provided, compatibly with the available overall dimensions. Providing for the articulated extension unit is not strictly necessary for the main teaching of the invention, even though it is preferred to configure the racked deposition system.

Again, as mentioned above, the shape of the articulated frame, the position and the number of articulation hinges and of constraint to the bracket, as well as the fixing position of the attaching and coupling units, may differ significantly from the illustrated one. For example, the four rods of the articulated frame 10 can be arranged as a fixed rod and three articulated moving rods with two hinges on the fixed rod.

Finally, the attaching and coupling units could comprise devices of different nature with respect to the suction cups, for example they could be in the form of electromagnets.

The invention claimed is:

1. A gripping tool to be mounted on a handling device for handling pieces cut out from planar sheets, the gripping tool comprising:
an engaging head ($T_2$) being interchangeably paired with an operating end of a displaceable handling device,
actuation means mounted on said engaging head ($T_2$), the actuation means comprising at least a first actuator unit (12), and
a plurality of attaching and coupling units ($N_1$-$N_4$) provided with attaching and coupling devices (1-4), mounted on said engaging head ($T_2$), wherein
said attaching and coupling units ($N_1$-$N_4$) are mounted on a frame (10) comprising at least four rods articulated together through respective hinging elements ($C_1$-$C_4$) arranged on a lying plane,
said attaching and coupling devices (1-4) being arranged on a plane parallel to said lying plane,
said articulated frame (10) being supported on said engaging head ($T_2$) and being comprised of the at least four rods that define four articulated arms (10i, 10ii, 10iii, 10iv) with opposite pairs of equal length, the articulated four articulated arms (10i, 10ii, 10iii, 10iv) being articulated together through the four hinging elements ($C_1$-$C_4$), and wherein
said first actuator unit (12) drives at least one of said at least four rods of said articulated frame (10) by rotation around at least one of said hinging elements ($C_1$-$C_4$) on said lying plane.

2. The tool as in claim 1, wherein said first actuator unit (12) drives said one of said at least four rods such that the articulated frame (10) takes two end-of-travel configurations, a folded one, wherein said attaching and coupling units ($N_1$-$N_4$) are close to each other and aligned, and a deployed one, wherein said attaching and coupling units ($N_1$-$N_4$) are spaced apart along two different Cartesian axes.

3. The tool as in claim 2, wherein said attaching and coupling units ($N_1$-$N_4$) are arranged at the hinging elements ($C_1$-$C_4$).

4. The tool as in claim 3, wherein said articulated frame (10) is supported on said engaging head ($T_2$) through two parallel rotation pins ($C_5$, $C_6$) fixed and perpendicular to said lying plane.

5. The tool as in claim 3, wherein an articulated extension unit is provided between said engaging head ($T_2$) and said articulated frame (10), configured so that said lying plane may be rotated from a horizontal attitude to a vertical attitude.

6. The tool as in claim 2, wherein said articulated frame (10) is supported on said engaging head ($T_2$) through two parallel rotation pins ($C_5$, $C_6$) fixed and perpendicular to said lying plane.

7. The tool as in claim 6, wherein said four articulated rods ($10'^i$, $10'^{ii}$, $10'^{iii}$, $10'^{iv}$) are movably mounted, two of the four articulated rods (10i, 10ii, 10iii, 10iv) being connected integral in rotation with said parallel rotation pins ($C_5$, $C_6$).

8. The tool as in claim 7, wherein an articulated extension unit is provided between said engaging head ($T_2$) and said articulated frame (10), configured so that said lying plane may be rotated from a horizontal attitude to a vertical attitude.

9. The tool as in claim 6, wherein an articulated extension unit is provided between said engaging head ($T_2$) and said articulated frame (10), configured so that said lying plane may be rotated from a horizontal attitude to a vertical attitude.

10. The tool as in claim 2, wherein an articulated extension unit is provided between said engaging head ($T_2$) and said articulated frame (10), configured so that said lying plane may be rotated from a horizontal attitude to a vertical attitude.

11. The tool as in claim 2, wherein said articulated frame (10) is supported on said engaging head ($T_2$) through a dismountable intermediate head ($T_3$), composed of two paired plates.

12. The tool as in claim 1, wherein said attaching and coupling devices are in the form of suction cups (1-4) supported on respective valve bodies (5-8).

13. The tool as in claim 12, wherein an articulated extension unit is provided between said engaging head ($T_2$) and said articulated frame (10), configured so that said lying plane may be rotated from a horizontal attitude to a vertical attitude.

14. The tool as in claim 1, wherein an articulated extension unit is provided between said engaging head ($T_2$) and said articulated frame (10), configured so that said lying plane may be rotated from a horizontal attitude to a vertical attitude.

15. The tool as in claim 14, wherein said articulated extension unit has a swinging arm (15) rotatably mounted on a pneumatic cylinder ($M_1$) integral with said engaging head ($T_2$), the rotation axis of said pneumatic cylinder ($M_1$) being arranged horizontally.

16. A sorting system for cut-out metal sheet pieces (P) comprising the tool as in claim 14 as well as a deposition rack (R) provided with parallel bearing rods (21a, 21b) and with a corresponding up-right support (22) for supporting a plurality of up-right pieces (P) placed alongside to each other.

17. The tool as in claim 1, wherein said articulated frame (10) is supported on said engaging head ($T_2$) through a dismountable intermediate head ($T_3$), composed of two paired plates.

18. A gripper tool as in claim 1, wherein two opposite arms (10i and 10iii), of the four articulated arms, are C-shaped, with the hinged elements ($C_1$-$C_4$) of the two opposite arms (10i and 10iii) being arranged at curved ends of the C-shape.

19. A gripping tool to be mounted on a handling device for handling pieces cut out from planar sheets, the gripping tool comprising:
an engaging head ($T_2$) being interchangeably paired with an operating end of a displaceable handling device,
actuation means mounted on said engaging head ($T_2$), the actuation means comprising at least a first actuator unit (12), and
a plurality of attaching and coupling units ($N_1$-$N_4$) provided with attaching and coupling devices (1-4), mounted on said engaging head ($T_2$), wherein
said attaching and coupling units ($N_1$-$N_4$) are mounted on a frame (10) comprising at least four rods articulated together through respective hinging means ($C_1$-$C_4$) arranged on a lying plane,
said attaching and coupling devices (1-4) being arranged on a plane parallel to said lying plane,
said articulated frame (10) being supported on said engaging head ($T_2$), wherein
said first actuator unit (12) drives at least one of said rods of said articulated frame (10) by rotation around at least one of said hinging means ($C_1$-$C_4$) on said lying plane,
wherein an articulated extension unit is provided between said engaging head ($T_2$) and said articulated frame (10), configured so that said lying plane may be rotated from a horizontal attitude to a vertical attitude, and
wherein said articulated extension unit has a swinging arm (15) rotatably mounted on a pneumatic cylinder ($M_1$) integral with said engaging head ($T_2$), the rotation axis of said pneumatic cylinder ($M_1$) being arranged horizontally.

20. A sorting system for cut-out metal sheet pieces (P) comprising:
a gripping tool to be mounted on a handling device for handling pieces cut out from planar sheets, the gripping tool comprising:
an engaging head ($T_2$) being interchangeably paired with an operating end of a displaceable handling device,
actuation means mounted on said engaging head ($T_2$), the actuation means comprising at least a first actuator unit (12), and
a plurality of attaching and coupling units ($N_1$-$N_4$) provided with attaching and coupling devices (1-4), mounted on said engaging head ($T_2$), wherein
said attaching and coupling units ($N_1$-$N_4$) are mounted on a frame (10) comprising at least four rods articulated together through respective hinging means ($C_1$-$C_4$) arranged on a lying plane,
said attaching and coupling devices (1-4) being arranged on a plane parallel to said lying plane,
said articulated frame (10) being supported on said engaging head ($T_2$), wherein
said first actuator unit (12) drives at least one of said rods of said articulated frame (10) by rotation around at least one of said hinging means ($C_1$-$C_4$) on said lying plane,
wherein an articulated extension unit is provided between said engaging head ($T_2$) and said articulated frame (10), configured so that said lying plane may be rotated from a horizontal attitude to a vertical attitude; and
a deposition rack (R) provided with parallel bearing rods (21a, 21b) and with a corresponding up-right support (22) for supporting a plurality of up-right pieces (P) placed alongside to each other.

* * * * *